Figure 1:
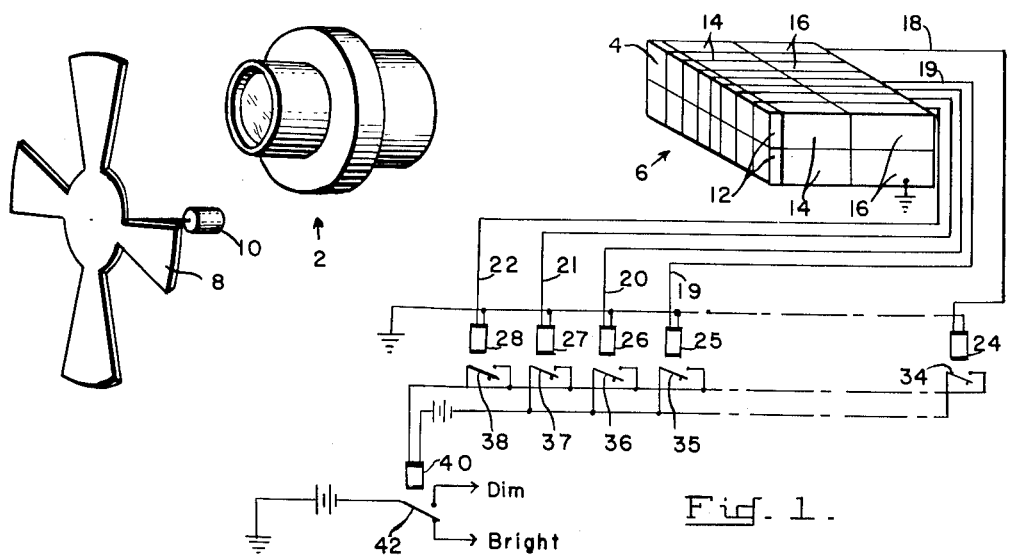

Feb. 7, 1956  J. RABINOW  2,734,149
BRIGHT-SPOT SENSITIVE HEADLIGHT DIMMER
Filed March 16, 1953

INVENTOR

JACOB RABINOW

BY  Max L. Libman

ATTORNEY

United States Patent Office

2,734,149
Patented Feb. 7, 1956

2,734,149

BRIGHT-SPOT SENSITIVE HEADLIGHT DIMMER

Jacob Rabinow, Takoma Park, Md.

Application March 16, 1953, Serial No. 342,508

4 Claims. (Cl. 315—83)

This invention relates to automatic headlight dimmers of the type in which dimming of a vehicle headlight is actuated in response to the presence of a bright spot of illumination in the field of view ahead of a vehicle, such as would be caused by the lights of an oncoming vehicle or any other source of intense light, and has for its primary object the provision of an automatic headlight dimmer which responds to a predetermined intensity of illumination of such bright spots rather than to the total quantity of light received from the field of view.

It is one disadvantage of the majority of known headlight dimmers that they respond to the total illumination received from the field of view rather than to the intensity of the brightest portion of the field of view. The advantages of the latter type of response, as well as one system for utilizing these advantages, are shown in my prior U. S. Patent No. 2,632,040, for "Automatic Headlight Dimmer." The present invention is directed to a different apparatus for utilizing a function of the maximum local intensity of illumination in the field of view to actuate a headlight dimmer, and has certain advantages of simplicity of operation as will be shown below.

It is a primary object of my invention to produce a simplified system which will accomplish the functions of my above referred to earlier patent without requiring the field of view to be periodically scanned. A further object is to produce a simple system which will respond to the maximum intensity of illumination of the field of view rather than to the total light received. A still further object is to provide a system having a high signal-to-noise ratio.

The specific nature of the invention as well as other objects and advantages thereof will clearly appear from a description of a preferred embodiment as shown in the accompanying drawing, in which:

The figure is a schematic circuit diagram showing one form of the invention.

Referring to the drawing, light from the desired field of view is passed through lens 2 to form an image on the light-sensitive surface 4 of a composite mosaic of photo-sensitive elements generally indicated by reference numeral 6. A light chopping means which may be of any conventional construction, and is schematically represented by rotating light chopper 8 driven by suitable motor 10 is employed to periodically interrupt the light received by the lens and hence by the photo-sensitive surface 4. This is done so that the electrical output of the photo-sensitive elements described below will be correspondingly periodically interrupted, whereby an A. C. amplifier may be used, since this is more convenient and requires simpler apparatus than the use of D. C. amplifiers. However, it will be understood that other forms of modulation or that the use of D. C. amplifiers, if desired, is within the scope and purview of my invention.

The mosaic of light-sensitive elements 6 is composed of any suitable or desired number of separate light-sensitive elements 12, shown by way of example as sixteen elements, although it will be apparent that any desired number may be employed. Each element therefore receives the light from a definite portion of the field of view. Each element is provided with a separate amplifier 14 followed by a suitable rectifier 16 of conventional design, whereby the output on leads 19 to 22 of the respective light sensitive-amplifier units is a function of the amount of light falling upon the respective photo-sensitive elements, and hence a function of the light emanating from the respective subdivisions of the field of view. The output of each photo-sensitive unit is separately fed to an associated relay 24 to 28, one such relay being provided for each photo-sensitive element in the mosaic, although only five are shown to illustrate the circuit employed. These relays control a set of parallel switches 34 to 38 so arranged that the operation of any one switch will close a circuit through master relay 40 which will operate its associate headlight dimming switch 42 to cause dimming of the headlights, switch 42 being normally in the bright headlight position as shown. It will thus be seen that whenever the intensity of illumination on any one of the photo-sensitive elements of the mosaic exceeds a predetermined value, the headlights will be dimmed. Since the intensity of illumination from an oncoming headlight source or any other bright source is always greater than the general background illumination of the field of view when it is desired to dim, it will be clear that the setting of the relays can be made such that dimming will occur only when one of the elemental areas of subdivisions of the field of view represented by the mosaic elements receives an amount of light corresponding in order of magnitude to that emanating from an oncoming headlight, but not an amount of light emanating from the general background. Thus, even though the total amount of light received from the field of view due to scattered illumination such as sky light and the total effect of weak sources of illumination in the field of view may be equal to the total amount of light received from the oncoming headlights, none of the relays will be operated due to this general background illumination because each receives only, in the example shown, one-sixteenth of that total illumination. The same amount of illumination coming from the headlights of an opposing vehicle will be focused by the lens on only one of the cells, in the general case, and therefore that cell will receive sixteen times as much light as the others, which will readily actuate the relay corresponding to that cell. It is true that some of the time the light of the two oncoming headlights will be divided between two or as many as four cells in the case where the light falls directly upon the common corners of four adjacent cells, and in this case the light upon each cell will be only four times as great as if it were spread over all sixteen cells, but it will be apparent that there is still a large differential in illumination with the arrangement shown and that this differential can be increased by increasing the number of cells in the field. Also, the light spot may be spread over the area of more than one cell by defocussing the image somewhat.

Although a mosaic of sixteen cells is shown by way of example, it will be apparent that any number greater than one may be used to advantage, for example, if even two cells are used and each is set to operate at a predetermined illumination intensity corresponding to that of a headlight at the distance at which it is desired to dim, then there is an advantage to be gained since if either half of the field of view is of this intensity the lights will be dimmed, even though the intensity from the other half is very low. The full intensity of the one-half which is bright is used to produce a signal on the cell which is actuated since it will fall on one or the other cell, except for the rare situation where the image falls across the line between the two cells equally. Thus the effective discrimination between a bright area and the general background is improved by the use of even two cells as shown, and the advantage is increased within practical limits as the number of cells in the mosaic is increased.

For photo-elements suitable for the required mosaics, the recently developed photo-transistors are available and have the advantage of small size which enables them to divide the field of view into suitably small elements so that a reasonably sized optical system can be employed. Similarly, the amplifier for each cell can employ transistor elements, which are now well known in the art and are available, and which enables the entire mosaic of cells and amplifiers to be housed in a reasonably sized unit. It is, of course, necessary, in order to secure the above described advantages that there be a separate amplifier for each cell, as otherwise if all the outputs were lumped into a common amplifier, the effect of each cell would only be the accumulative effect due to its area and would therefore be the same as the effect of a single cell; in other words, each cell would have only its proportionate percentage of the total effect, and the special improved effects produced by the invention would not be obtained.

For some purposes, it may be of advantage to employ differential action where more than one cell is used, that is, in the arrangement of Fig. 1. This can be readily accomplished by connecting each of the photo-cells to one input of a series of comparison amplifiers, the other input of which is fed by the combined and averaged output of all the cells. Such a system would respond to the difference between the average intensity of illumination over the whole area of the field of view and the intensity of the illumination of each cell of the mosaic. However, essentially the same effect can be accomplished by the system shown by properly adjusting the sensitivity to secure optimum operation at the desired range, which will be satisfactory for most conditions of operation encountered and is preferred because of its greater simplicity. It will be noted that the system of Fig. 1 is effective to differentiate between a local bright spot of illumination and the same amount of illumination diffused over the entire field of vision, which is essentially the desired result.

It will be understood that the above description is schematic and omits many known or obvious features of a headlight dimmer which are not essential to the present invention, such for example as an over-riding footswitch which would normally be provided to permit over-riding of the automatic operation at the will of the operator for either dim or bright action of the headlights. This would normally be desirable both to permit the operator to dim the headlights regardless of conditions in the field of view in situations where such dimming is required by law, for example, in city driving or in passing through some tunnels, also where it is desired to flick the lights up and down to remind an oncoming motorist to dim his headlights. It should also be possible in some circumstances to combine the scanning feature of my previously referred to Patent No. 2,632,040 with some of the features of the present invention, for example, by providing a single line of cells, and scanning with a slotted aperture corresponding to such line.

It will be apparent that the embodiments shown are only exemplary and that various modifications can be made in construction and arrangement within the scope of my invention as defined in the appended claims.

I claim:

1. Automatic headlight dimming means comprising means for producing an image of a selected field of view, a plurality of separate means independently and simultaneously responsive to light on different portions of said image to produce output signals which are a function of the light intensity on the respective different portions, and dimming means controlled by said output signals for actuation whenever any of said output signals attains a predetermined level.

2. A headlight dimmer comprising optical means for producing an image of a desired field of view, a plurality of photo-sensitive elements cooperatively arranged with said optical means so that said image impinges on said photo-sensitive elements with a different portion of the image on each cell, electrical output means associated with each of said elements to detect the effect of the amount of light impinging on each of said elements, and a single headlight dimming means actuated by any of said output means.

3. The invention recited in claim 2, and means to operate said dimming means whenever the amount of light impinging on any one element exceeds a predetermined value.

4. An automatic headlight dimmer comprising optical means for forming an image of a field of view, a photoelectric system having a photo-sensitive surface in the focus of said optical means and so arranged that said entire image falls on said surface at one time, said photoelectric system comprising means responsive to a predetermined intensity of illumination of any minimum area of said image to actuate a headlight dimmer.

References Cited in the file of this patent

UNITED STATES PATENTS

| | | |
|---|---|---|
| 2,412,822 | Malter | Dec. 17, 1946 |
| 2,417,023 | Sweet | Mar. 4, 1947 |
| 2,433,557 | Hurley, Jr. | Dec. 30, 1947 |
| 2,476,382 | Pillus | Jan. 19, 1949 |
| 2,478,163 | Sweet | Aug. 2, 1949 |
| 2,615,079 | Pardue et al. | Oct. 21, 1952 |
| 2,632,040 | Rabinow | Mar. 17, 1953 |